United States Patent
Uchida et al.

(10) Patent No.: US 8,675,286 B2
(45) Date of Patent: *Mar. 18, 2014

(54) ZOOM LENS SYSTEM, INTERCHANGEABLE LENS APPARATUS AND CAMERA SYSTEM

(75) Inventors: Tsuneo Uchida, Chiba (JP); Koji Hoshi, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 158 days.

This patent is subject to a terminal disclaimer.

(21) Appl. No.: 13/183,450

(22) Filed: Jul. 15, 2011

(65) Prior Publication Data

US 2012/0013993 A1    Jan. 19, 2012

(30) Foreign Application Priority Data

Jul. 15, 2010    (JP) ................................ 2010-160382
Jun. 2, 2011    (JP) ................................ 2011-124619

(51) Int. Cl.
*G02B 15/16*      (2006.01)

(52) U.S. Cl.
USPC ........................... 359/676; 359/686; 359/689

(58) Field of Classification Search
CPC ......... G02B 15/02; G02B 15/16; G02B 15/20
USPC .................. 359/676–679, 683, 684, 686, 689
See application file for complete search history.

(56) References Cited

U.S. PATENT DOCUMENTS

| 6,091,901 | A | * | 7/2000 | Ogawa ........................... 396/55 |
| 7,126,758 | B2 | * | 10/2006 | Fujimoto et al. ............. 359/676 |
| 8,379,309 | B2 | * | 2/2013 | Uchida et al. ................. 359/557 |

FOREIGN PATENT DOCUMENTS

| JP | 2000-298236 A | 10/2000 |
| JP | 2001-117006 A | 4/2001 |
| JP | 2004-334185 A | 11/2004 |
| JP | 2005-077917 A | 3/2005 |

\* cited by examiner

*Primary Examiner* — Darryl J Collins
(74) *Attorney, Agent, or Firm* — Judge Patent Associates

(57) ABSTRACT

A zoom lens system comprising: a first lens unit having positive optical power; a second lens unit having positive optical power; and at least one subsequent lens unit, wherein the zoom lens system has an image blur compensating lens unit which moves in a direction perpendicular to an optical axis, at least the first lens unit moves along the optical axis at the time of zooming from a wide-angle limit to a telephoto limit, the second lens unit or a third lens unit which is located closest to the object side in the at least one subsequent lens unit moves along the optical axis at the time of focusing from an infinity in-focus condition to a close-object in-focus condition, and the condition: $0.10<|m|/(f_T-f_W)<0.40$ (m: the maximum value among the amounts of movement of each subsequent lens unit at the time of zooming from a wide-angle limit to a telephoto limit, $f_T$, $f_W$: focal lengths of the entire system at a telephoto limit, at a wide-angle limit) is satisfied; an interchangeable lens apparatus; and a camera system are provided.

8 Claims, 13 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-160382 filed in Japan on Jul. 15, 2010 and application No. 2011-124619 filed in Japan on Jun. 2, 2011, the contents of which are hereby incorporated by reference.

BACKGROUND OF THE INVENTION

1. Field of the Invention

The present invention relates to a zoom lens system, an interchangeable lens apparatus, and a camera system. In particular, the present invention relates to: a zoom lens system which is suitable as an imaging lens system in, so-called, an interchangeable-lens type digital camera system; and an interchangeable lens apparatus and a camera system each employing this zoom lens system.

2. Description of the Background Art

In recent years, interchangeable-lens type digital camera systems have been spreading rapidly. Such interchangeable-lens type digital camera systems (also referred to simply as "camera systems", hereinafter) include: a camera body having an image sensor such as a CCD (Charge Coupled Device), a CMOS (Complementary Metal-Oxide Semiconductor) or the like; and an interchangeable lens apparatus having an imaging lens system for forming an optical image on a light receiving surface of the image sensor.

Such interchangeable-lens type digital camera systems are able to take a high-sensitive and high-quality image because an image sensor used in the interchangeable-lens type digital camera systems is larger than that equipped for a compact type digital camera. In addition, the interchangeable-lens type digital camera systems can realize: high-speed focusing and high-speed image processing after image taking; and easy replacement of an interchangeable lens apparatus in accordance with a desired scene. Furthermore, an interchangeable lens apparatus having a zoom lens system that forms an optical image with variable magnification is popular because it allows free change of focal length without the necessity of lens replacement. Accordingly, for some time, various kinds of zoom lens systems have been proposed, which can be utilized as an imaging lens system in the interchangeable-lens type digital camera systems, such as a zoom lens system disclosed in each of Japanese Laid-Open Patent Publications No. 2004-334185, No. 2001-117006, No. 2000-298236 and No. 2005-077917.

Although the interchangeable-lens type digital camera systems show the above-mentioned various kinds of merits, the size and the weight of such interchangeable-lens type digital camera systems are greater than those of a compact type digital camera. It is preferable that the size and the weight of the interchangeable-lens type digital camera systems are as small as possible for easy carrying around and handling. Accordingly, a most compact and lightweight possible zoom lens system with maintaining imaging performance is desired as a zoom lens system to be used in the interchangeable-lens type digital camera systems.

SUMMARY OF THE INVENTION

One object of the present invention is to provide a compact and lightweight zoom lens system having excellent imaging performance, which can be suitably used in an interchangeable-lens type digital camera system. Another object of the present invention is to provide compact and lightweight interchangeable lens apparatus and camera system.

The novel concepts disclosed herein were achieved in order to solve the foregoing problems in the conventional art, and herein is disclosed:

a zoom lens system, in order from an object side to an image side, comprising:
a first lens unit having positive optical power;
a second lens unit having positive optical power; and
at least one subsequent lens unit, wherein
the zoom lens system has an image blur compensating lens unit which moves in a direction perpendicular to an optical axis in order to optically compensate image blur,
at least the first lens unit moves along the optical axis at the time of zooming from a wide-angle limit to a telephoto limit,
the second lens unit or a third lens unit which is located closest to the object side in the at least one subsequent lens unit moves along the optical axis at the time of focusing from an infinity in-focus condition to a close-object in-focus condition, and
the following condition (1) is satisfied:

$$0.10 < |m|/(f_T - f_W) < 0.40 \quad (1)$$

where
m is the maximum value among the amounts of movement of each subsequent lens unit at the time of zooming from a wide-angle limit to a telephoto limit,
$f_T$ is a focal length of the entire system at a telephoto limit, and
$f_W$ is a focal length of the entire system at a wide-angle limit.

The novel concepts disclosed herein were achieved in order to solve the foregoing problems in the conventional art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal; wherein
the zoom lens system, in order from an object side to an image side, comprises:
a first lens unit having positive optical power;
a second lens unit having positive optical power; and
at least one subsequent lens unit, wherein
the zoom lens system has an image blur compensating lens unit which moves in a direction perpendicular to an optical axis in order to optically compensate image blur,
at least the first lens unit moves along the optical axis at the time of zooming from a wide-angle limit to a telephoto limit,
the second lens unit or a third lens unit which is located closest to the object side in the at least one subsequent lens unit moves along the optical axis at the time of focusing from an infinity in-focus condition to a close-object in-focus condition, and the following condition (1) is satisfied:

$$0.10 < |m|/(f_T - f_W) < 0.40 \quad (1)$$

where
m is the maximum value among the amounts of movement of each subsequent lens unit at the time of zooming from a wide-angle limit to a telephoto limit,
$f_T$ is a focal length of the entire system at a telephoto limit, and
$f_W$ is a focal length of the entire system at a wide-angle limit.

The novel concepts disclosed herein were achieved in order to solve the foregoing problems in the conventional art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal; wherein the zoom lens system, in order from an object side to an image side, comprises:

a first lens unit having positive optical power;

a second lens unit having positive optical power; and at least one subsequent lens unit, wherein the zoom lens system has an image blur compensating lens unit which moves in a direction perpendicular to an optical axis in order to optically compensate image blur, at least the first lens unit moves along the optical axis at the time of zooming from a wide-angle limit to a telephoto limit, the second lens unit or a third lens unit which is located closest to the object side in the at least one subsequent lens unit moves along the optical axis at the time of focusing from an infinity in-focus condition to a close-object in-focus condition, and the following condition (1) is satisfied:

$$0.10 < |m|/(f_T - f_W) < 0.40 \qquad (1)$$

where m is the maximum value among the amounts of movement of each subsequent lens unit at the time of zooming from a wide-angle limit to a telephoto limit, $f_T$ is a focal length of the entire system at a telephoto limit, and $f_W$ is a focal length of the entire system at a wide-angle limit.

According to the present invention, it is possible to provide: a compact and lightweight zoom lens system having excellent imaging performance; and an interchangeable lens apparatus and a camera system each employing this zoom lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

FIGS. 1, 4, 7, and 10 are lens arrangement diagrams of zoom lens systems according to Embodiments 1, 2, 3, and 4, respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Figure 1:
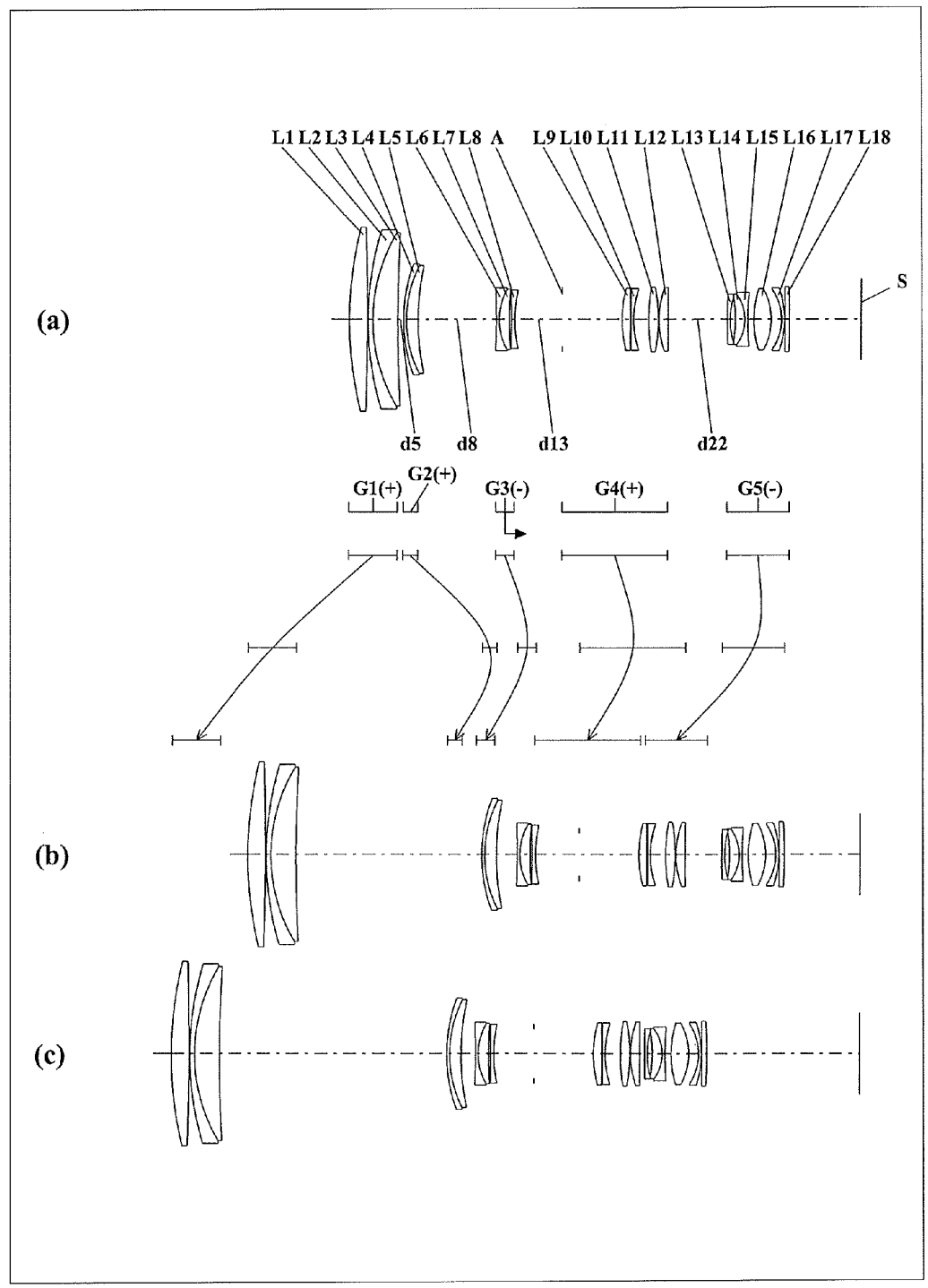
FIG. 1 is a lens arrangement diagram showing an infinity in-focus condition of a zoom lens system according to Embodiment 1 (Example 1)
Figure 2:
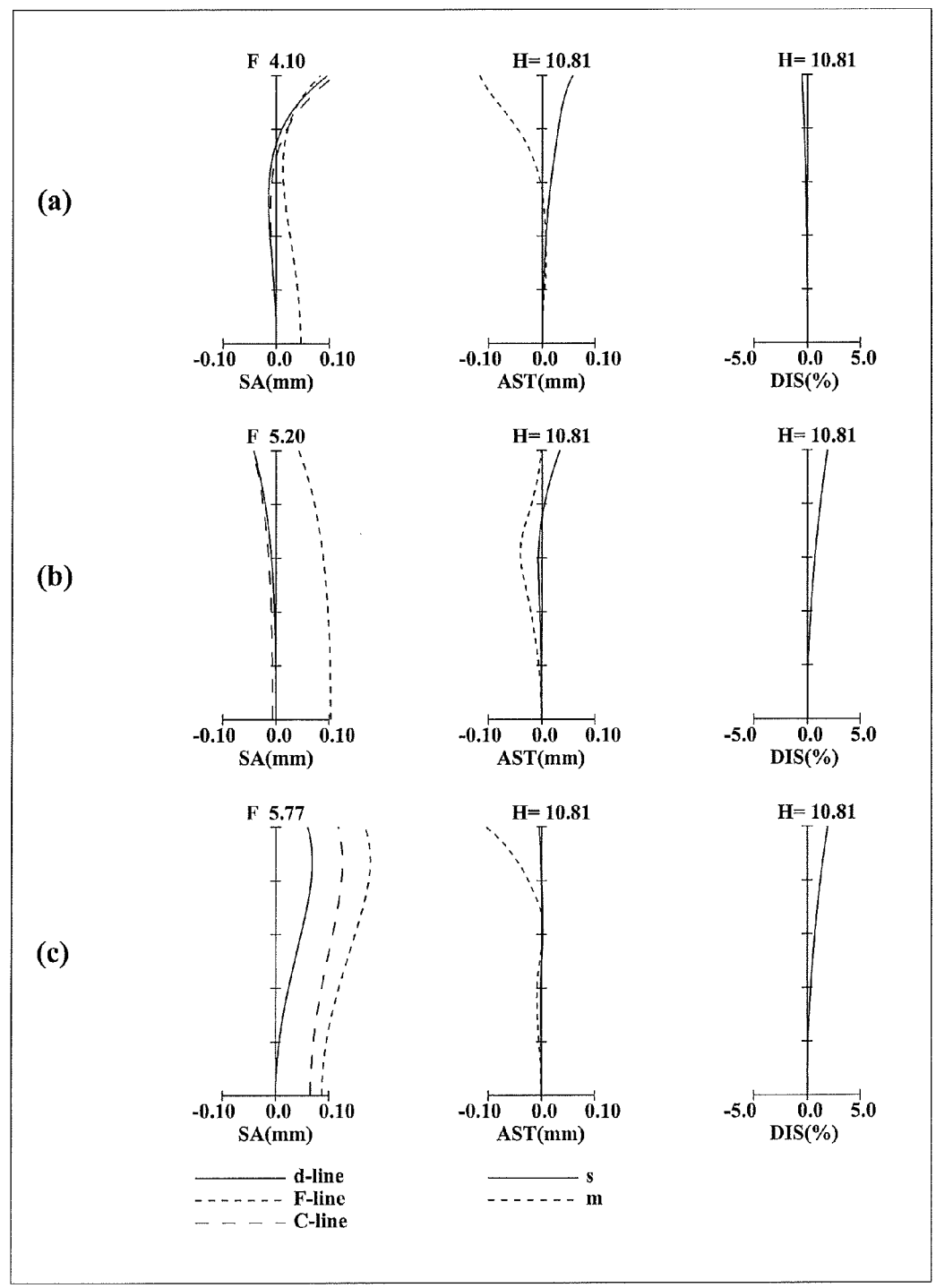
FIG. 2 is a longitudinal aberration diagram of an infinity in-focus condition of a zoom lens system according to Example 1.
Figure 3:
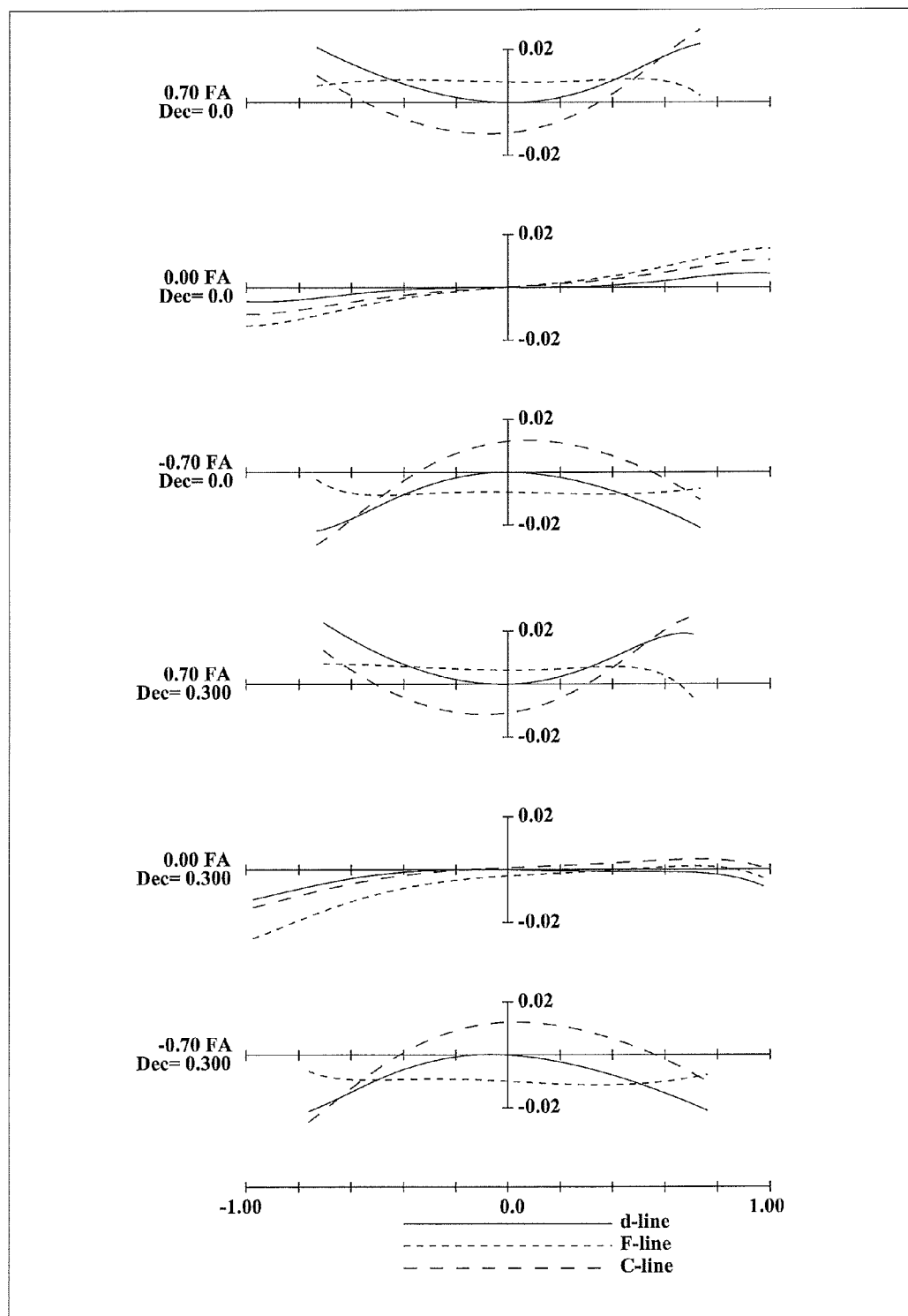
FIG. 3 is a lateral aberration diagram of a zoom lens system according to Example 1 at a telephoto limit in a basic state where image blur compensation is not performed and in an image blur compensation state.
Figure 4:
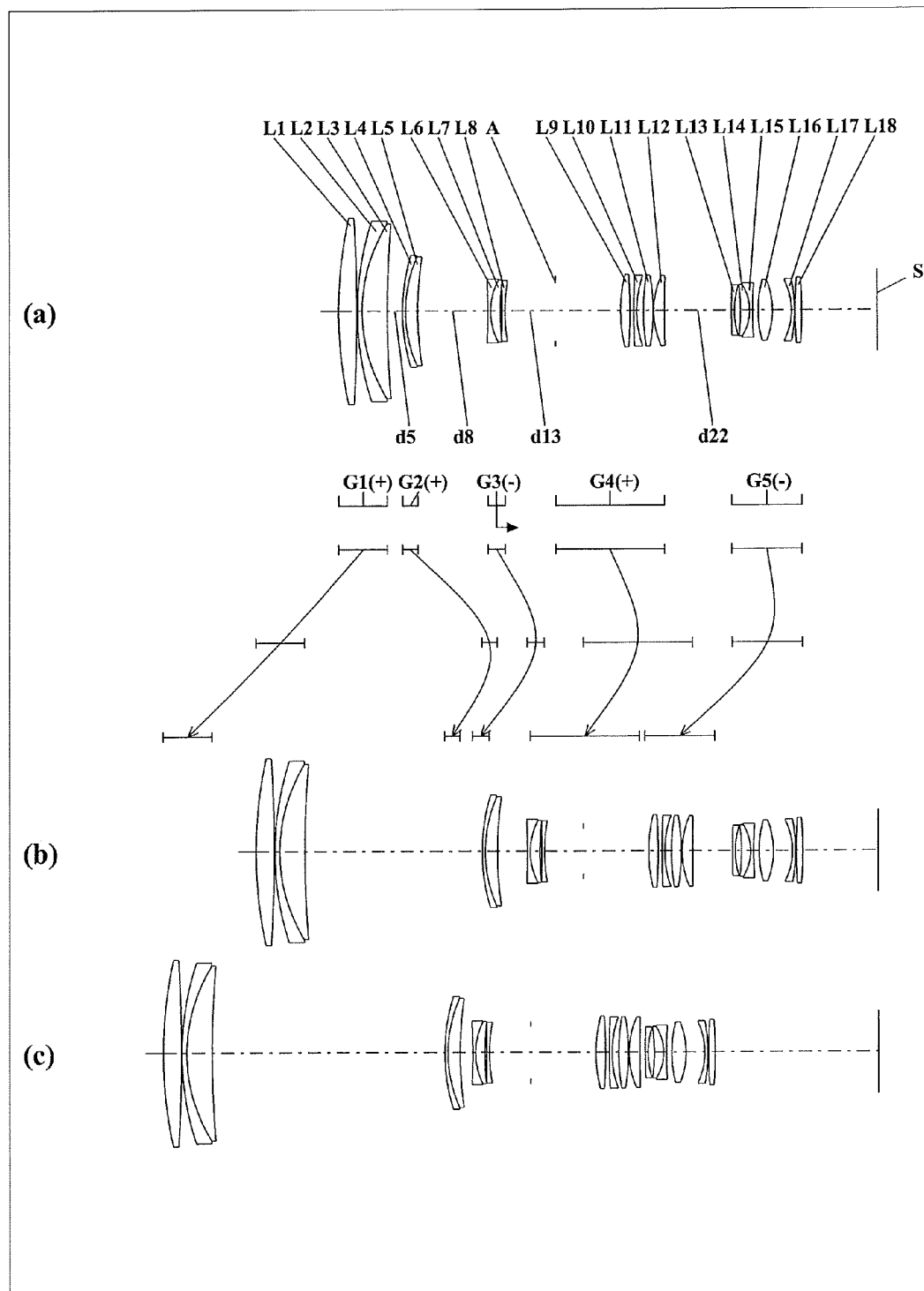
FIG. 4 is a lens arrangement diagram showing an infinity in-focus condition of a zoom lens system according to Embodiment 2 (Example 2)
Figure 5:
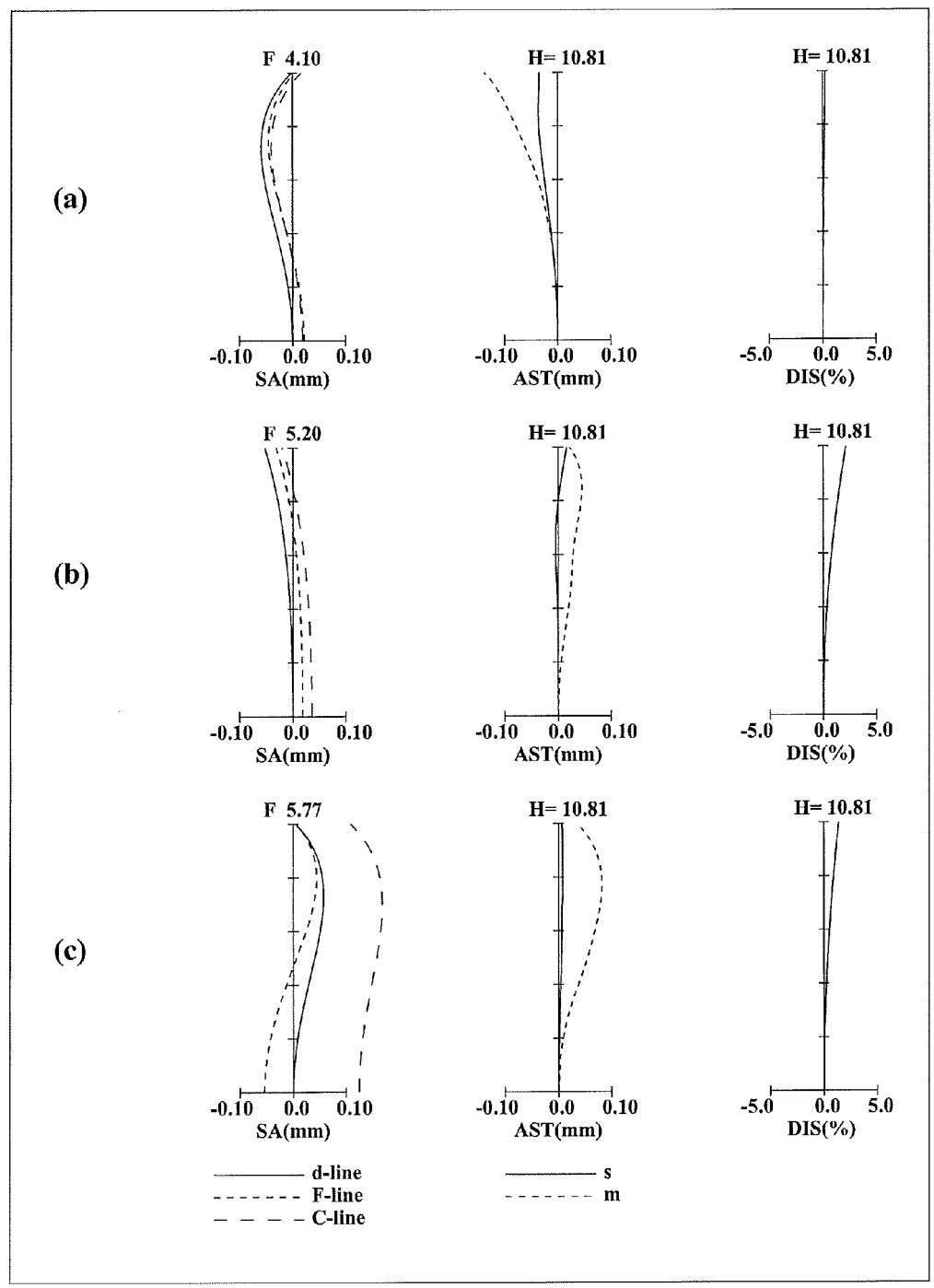
FIG. 5 is a longitudinal aberration diagram showing an infinity in-focus condition of a zoom lens system according to Example 2.
Figure 6:
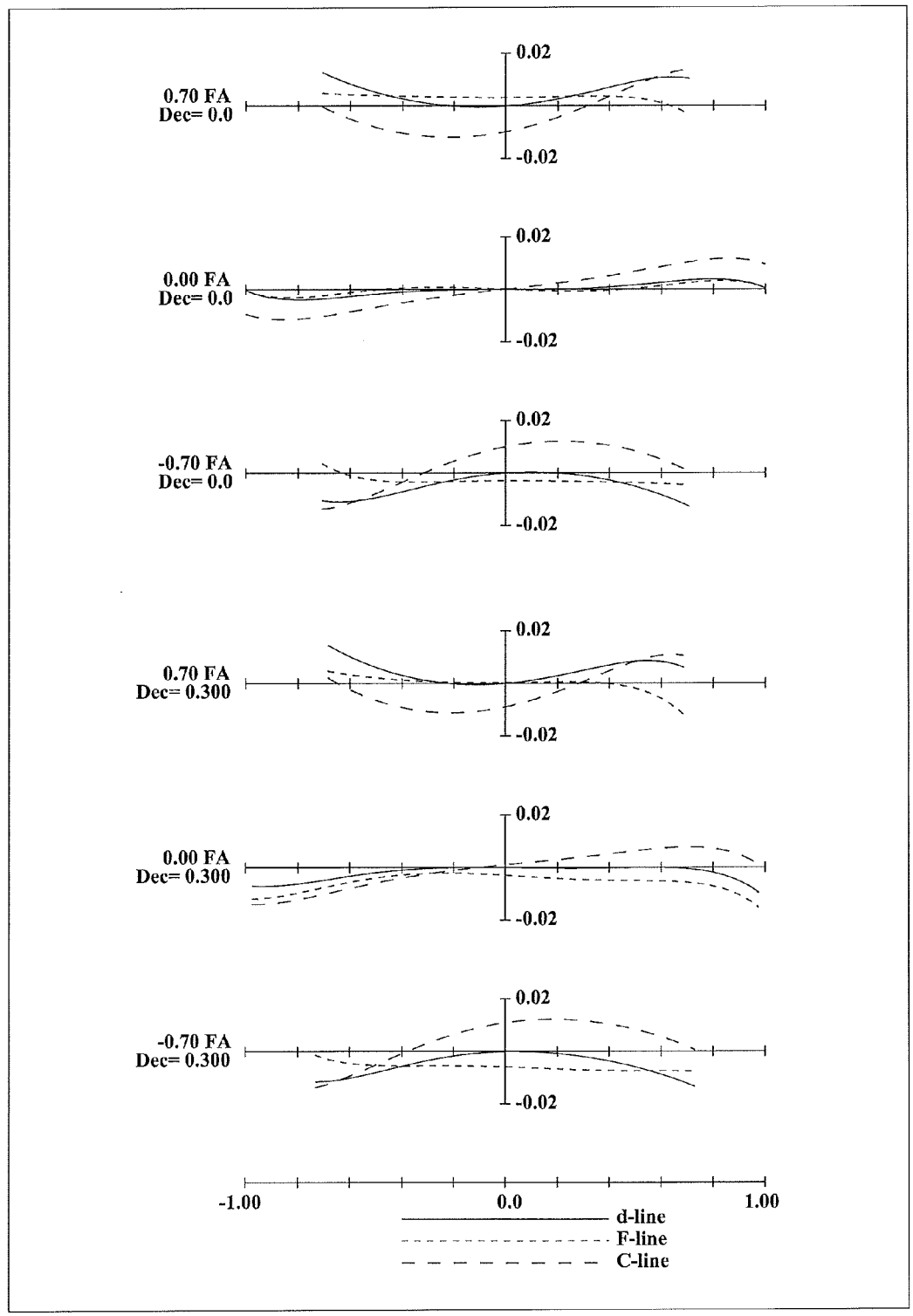
FIG. 6 is a lateral aberration diagram of a zoom lens system according to Example 2 at a telephoto limit in a basic state where image blur compensation is not performed and in an image blur compensation state.
Figure 7:
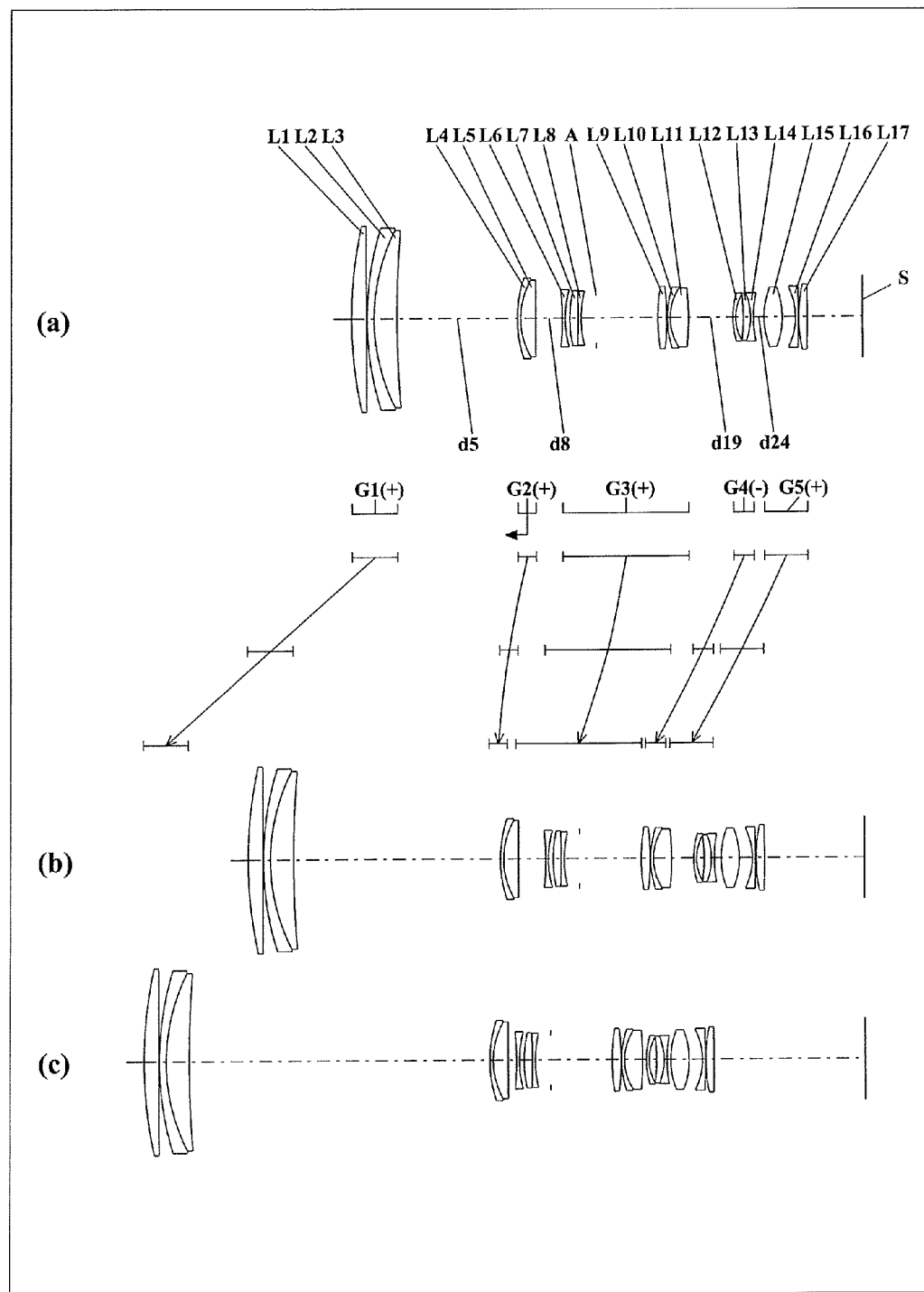
FIG. 7 is a lens arrangement diagram showing an infinity in-focus condition of a zoom lens system according to Embodiment 3 (Example 3)
Figure 8:
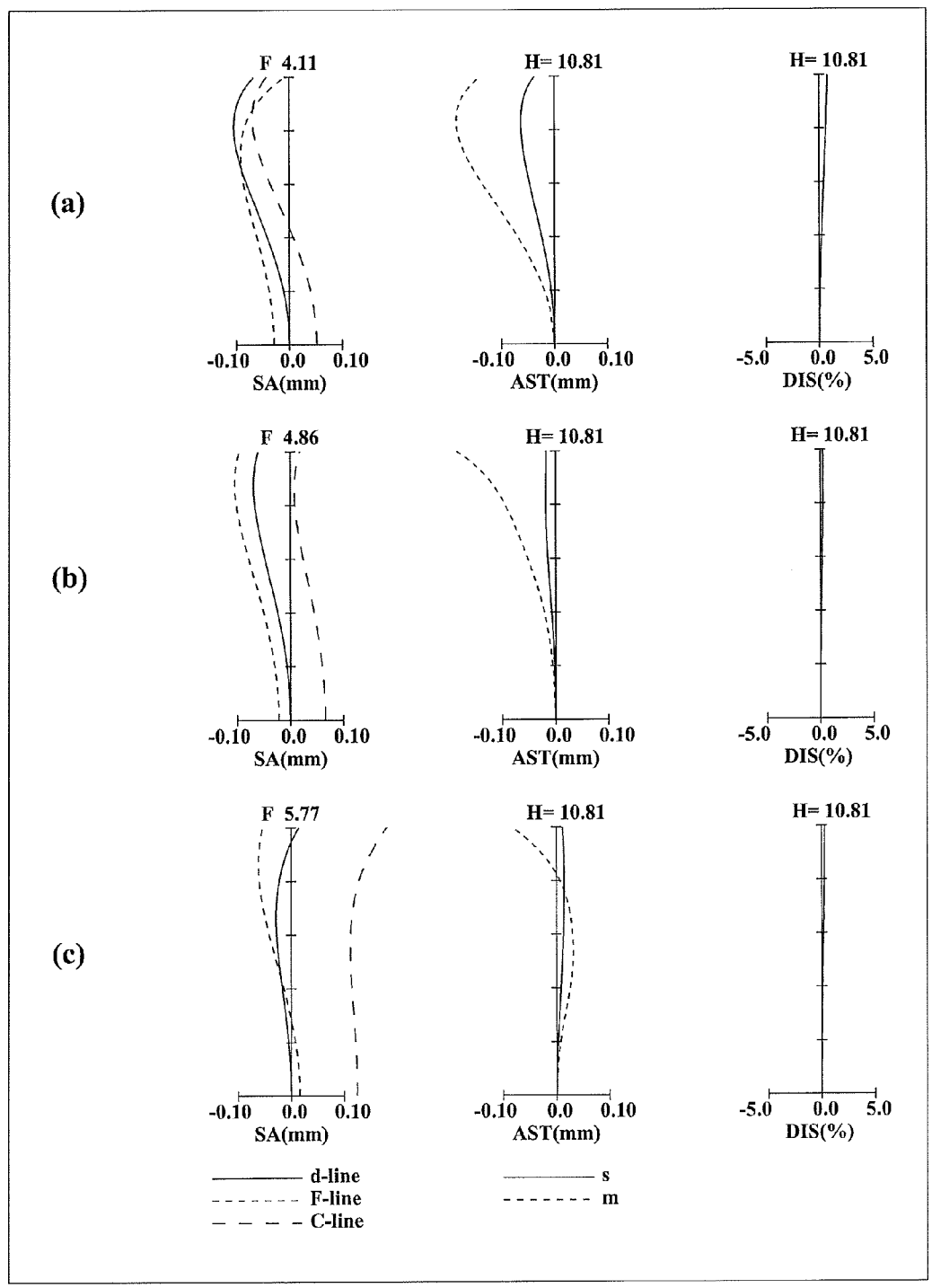
FIG. 8 is a longitudinal aberration diagram showing an infinity in-focus condition of a zoom lens system according to Example 3.
Figure 9:
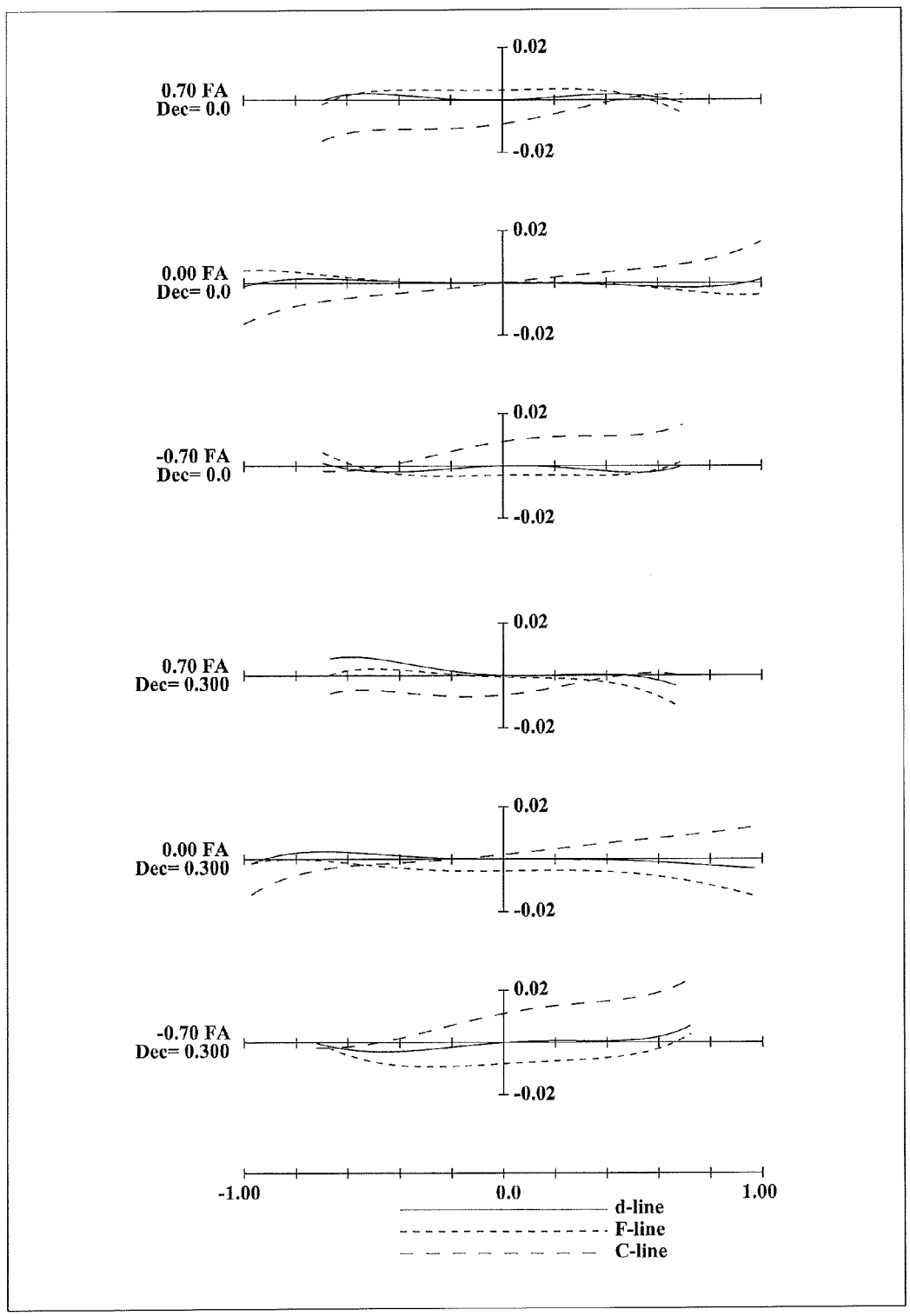
FIG. 9 is a lateral aberration diagram of a zoom lens system according to Example 3 at a telephoto limit in a basic state where image blur compensation is not performed and in an image blur compensation state.
Figure 10:
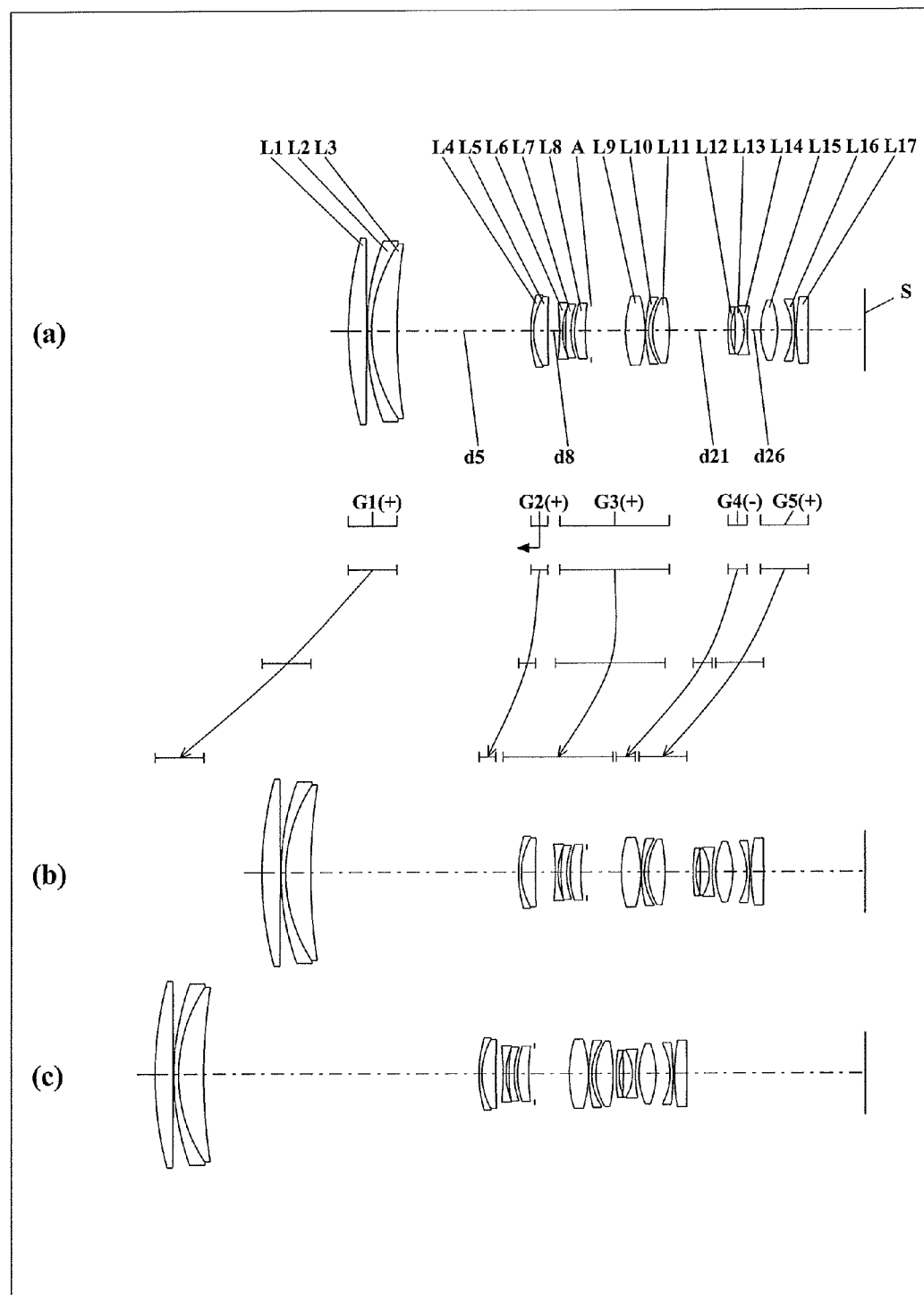
FIG. 10 is a lens arrangement diagram showing an infinity in-focus condition of a zoom lens system according to Embodiment 4 (Example 4)
Figure 11:
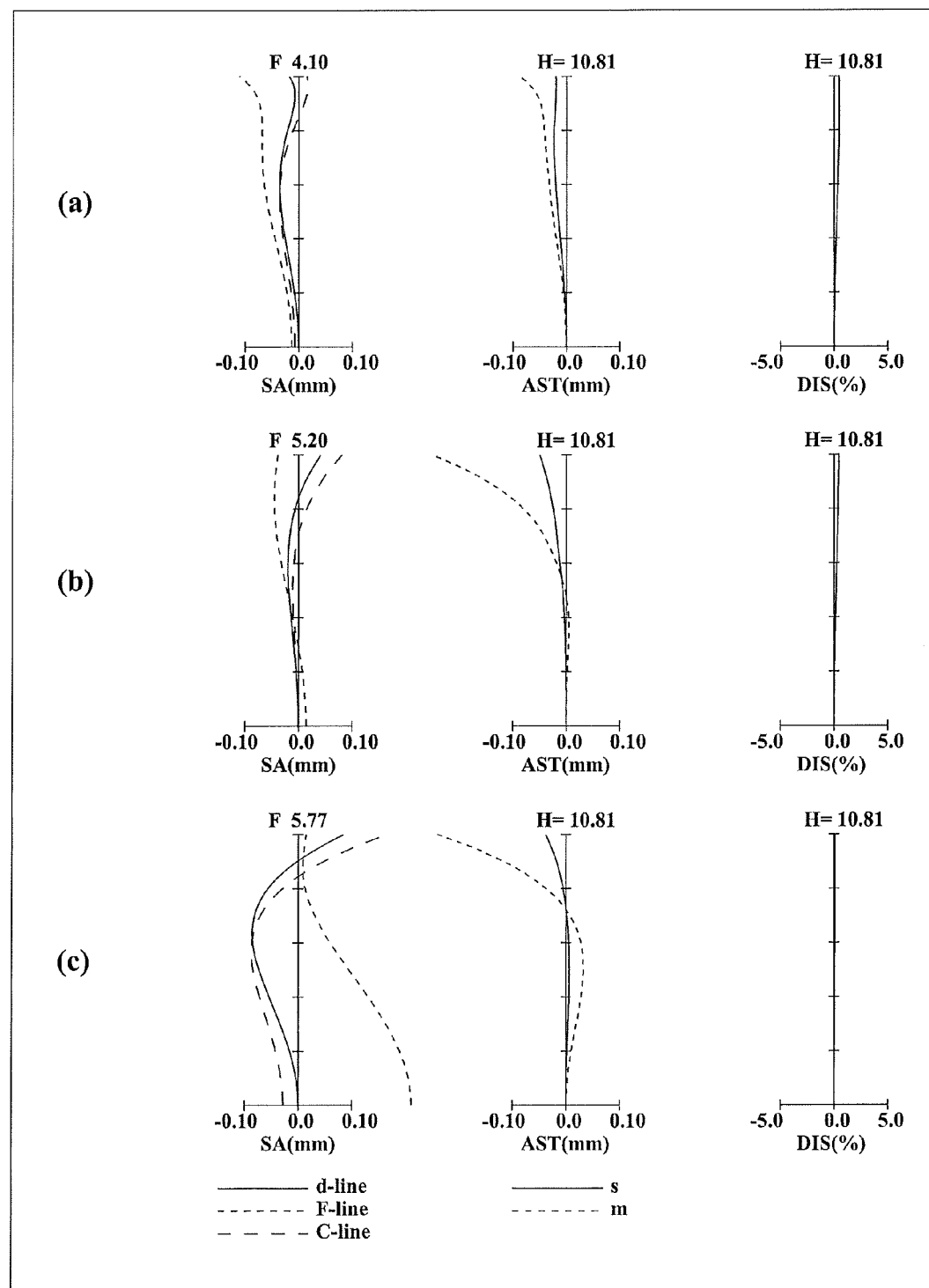
FIG. 11 is a longitudinal aberration diagram showing an infinity in-focus condition of a zoom lens system according to Example 4.
Figure 12:
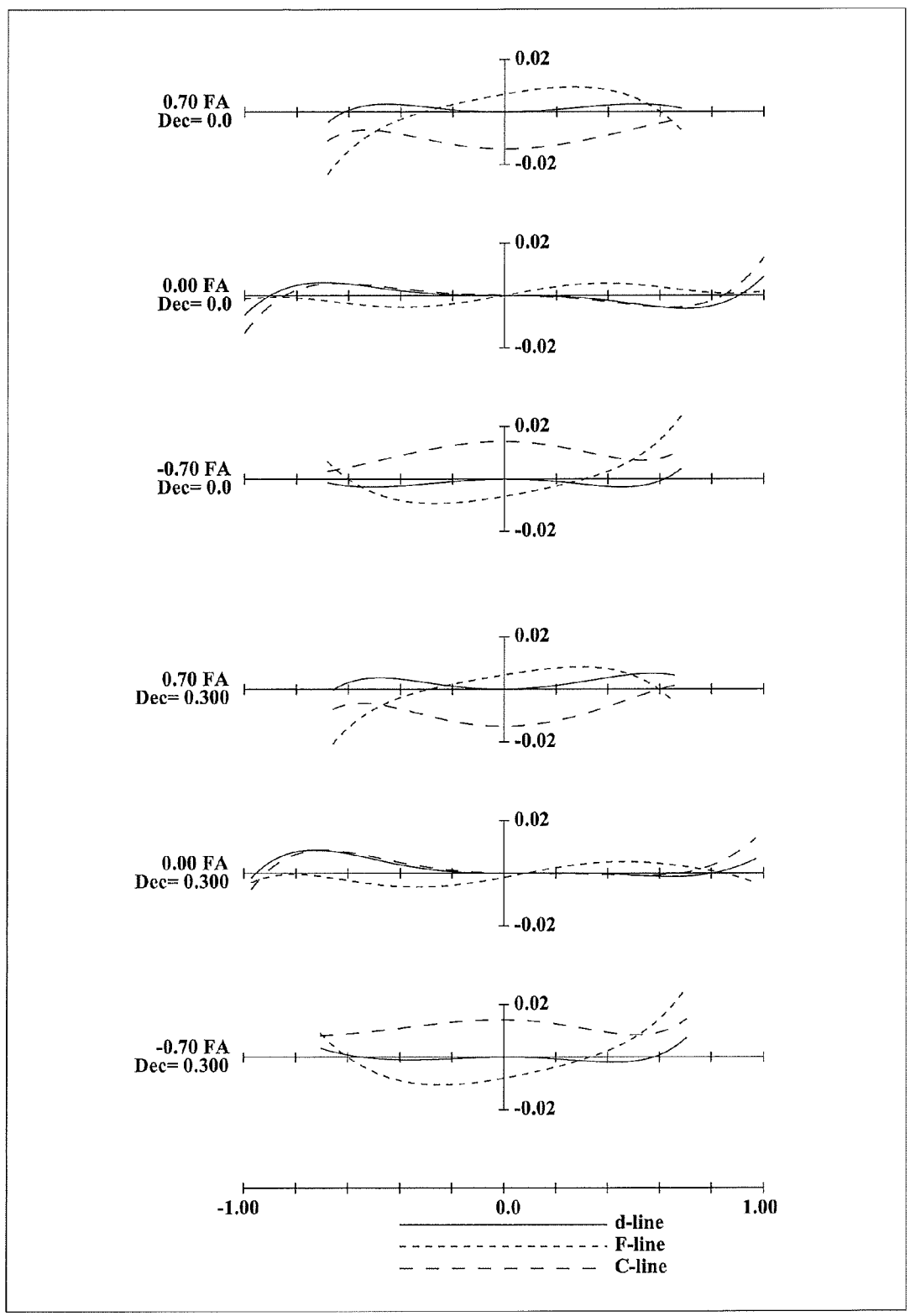
FIG. 12 is a lateral aberration diagram of a zoom lens system according to Example 4 at a telephoto limit in a basic state where image blur compensation is not performed and in an image blur compensation state.

In each Fig., symbol (+) or (−) imparted to the symbol of each lens unit corresponds to the sign of the optical power of the lens unit. In each Fig., the straight line located on the most right-hand side indicates the position of the image surface S. As shown in FIGS. 1 and 4, an aperture diaphragm A is provided within a fourth lens unit G4. Further, as shown in FIGS. 7 and 10, an aperture diaphragm A is provided within a third lens unit G3.

Each of the zoom lens systems according to Embodiments 1 to 4, in order from the object side to the image side, comprises a first lens unit G1 having positive optical power, a second lens unit G2 having positive optical power, and subsequent lens units, that is, the third lens unit G3, the fourth lens unit G4, and a fifth lens unit G5.

Embodiment 1

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a positive meniscus seventh lens element L7 with the convex surface facing the object side; and a bi-concave eighth lens element L8. The sixth lens element L6 and the seventh lens element L7 are cemented with each other.

The fourth lens unit G4, in order from the object side to the image side, comprises: an aperture diaphragm A; a bi-convex ninth lens element L9; a planer-concave tenth lens element L10 with the concave surface facing the image side; a bi-convex eleventh lens element L11; and a bi-convex twelfth lens element L12.

The fifth lens unit G5, in order from the object side to the image side, comprises: a negative meniscus thirteenth lens element L13 with the convex surface facing the object side; a positive meniscus fourteenth lens element L14 with the convex surface facing the image side; a bi-concave fifteenth lens element L15; a bi-convex sixteenth lens element L16; a negative meniscus seventeenth lens element L17 with the convex surface facing the image side; and a positive meniscus eighteenth lens element L18 with the convex surface facing the image side. The fourteenth lens element L14 and the fifteenth lens element L15 are cemented with each other.

Embodiment 2

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a positive meniscus seventh lens element L7 with the convex surface facing the object side; and a bi-concave eighth lens element L8. The sixth lens element L6 and the seventh lens element L7 are cemented with each other.

The fourth lens unit G4, in order from the object side to the image side, comprises: an aperture diaphragm A; a bi-convex ninth lens element L9; a negative meniscus tenth lens element L10 with the convex surface facing the object side; a bi-convex eleventh lens element L11; and a bi-convex twelfth lens element L12.

The fifth lens unit G5, in order from the object side to the image side, comprises: a negative meniscus thirteenth lens element L13 with the convex surface facing the object side; a positive meniscus fourteenth lens element L14 with the convex surface facing the image side; a bi-concave fifteenth lens element L15; a bi-convex sixteenth lens element L16; a negative meniscus seventeenth lens element L17 with the convex surface facing the image side; and a bi-convex eighteenth lens element L18. The fourteenth lens element L14 and the fifteenth lens element L15 are cemented with each other.

Embodiment 3

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a planer-convex fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a bi-convex seventh lens element L7; a bi-concave eighth lens element L8; an aperture diaphragm A; a bi-convex ninth lens element L9; a negative meniscus tenth lens element L10 with the convex surface facing the object side; and a bi-convex eleventh lens element L11. The seventh lens element L7 and the eighth lens element L8 are cemented with each other, and the tenth lens element L10 and the eleventh lens element L11 are cemented with each other.

The fourth lens unit G4, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The fifth lens unit G5, in order from the object side to the image side, comprises: a bi-convex fifteenth lens element L15; a negative meniscus sixteenth lens element L16 with the convex surface facing the image side; and a bi-convex seventeenth lens element L17.

Embodiment 4

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a negative meniscus seventh lens element L7 with the convex surface facing the object side; a positive meniscus eighth lens element L8 with the convex surface facing the object side; an aperture diaphragm A; a bi-convex ninth lens element L9; a negative meniscus tenth lens element L10 with the convex surface facing the object side; and a bi-convex eleventh lens element L11.

The fourth lens unit G4, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The fifth lens unit G5, in order from the object side to the image side, comprises: a bi-convex fifteenth lens element L15; a negative meniscus sixteenth lens element L16 with the convex surface facing the image side; and a bi-convex seventeenth lens element L17.

In the zoom lens systems according to Embodiments 1 to 4, at the time of zooming from a wide-angle limit to a telephoto limit, each of the lens units moves to the object side along the optical axis so that the interval between the first lens unit G1 and the second lens unit G2 is longer at a telephoto limit than at a wide-angle limit, the interval between the second lens unit G2 and the third lens unit G3 is shorter at a telephoto limit than at a wide-angle limit, the interval between the third lens unit G3 and the fourth lens unit G4 is shorter at a telephoto limit than at a wide-angle limit, and the interval between the fourth lens unit G4 and the fifth lens unit G5 is shorter at a telephoto limit than at a wide-angle limit. The aperture diaphragm A moves together with the third lens unit G3 or the fourth lens unit G4 along the optical axis.

Like in the zoom lens system according to each of the embodiments, it is preferable that the first lens unit G1 moves along the optical axis at the time of zooming from a wide-angle limit to a telephoto limit. In a case that the first lens unit G1 is a movable unit, the height of a light beam to following lens units can be reduced. As a result, the following lens units can be downsized, and the size and the weight of a focusing lens unit in a zoom lens system which adopts an inner-focus method can be reduced. In addition, it is preferable that the third lens unit G3 moves along the optical axis at the time of zooming. In a case that the third lens unit G3 is a magnification-changeable unit, imaging performance can be improved with realizing a downsized zoom lens system.

In the zoom lens systems according to Embodiments 1 to 2, the third lens unit G3 moves to the image side along the optical axis at the time of focusing from an infinity in-focus condition to a close-object in-focus condition. In the zoom lens systems according to Embodiments 1 to 2, excellent optical performance at a close-object in-focus condition can be maintained because the third lens unit G3 is composed of at least two lens elements. In addition, it is preferable that the third lens unit G3 which is a focusing lens unit has negative optical power. In this case, the weight of the third lens unit G3, that is, the focusing lens unit, can be reduced, and the lens diameter of the third lens unit G3 can be reduced.

In the zoom lens systems according to Embodiments 1 to 2, a sub lens unit which constitutes a part of the fifth lens unit G5 is moved in a direction perpendicular to the optical axis in order to optically compensate image blur caused by vibration of an optical system. Here, in a case that a lens unit is composed of a plurality of lens elements, the sub lens unit indicates any one lens element included in the lens unit or alternatively a combination of a plurality of adjacent lens elements among the plurality of lens elements included in the lens unit. Because the sub lens unit included in the subsequent lens units which are located on the image side relative to the aperture diaphragm A is an image blur compensating lens unit, excellent optical performance during image blur compensation can be maintained. It is preferable that the image blur compensating lens unit has negative optical power. In this case, the lens diameter of the image blur compensating lens unit can be reduced. In addition, when at least one lens element having positive optical power is arranged on the image side relative to the image blur compensating lens unit, excellent optical performance during image blur compensation can be maintained.

In the zoom lens systems according to Embodiments 3 to 4, the second lens unit G2 moves to the object side along the optical axis at the time of focusing from an infinity in-focus condition to a close-object in-focus condition. In the zoom lens systems according to Embodiments 3 to 4, the weight of a focusing lens unit can be reduced because the second lens unit G2, that is, the focusing lens unit, is composed of two lens elements. In addition, it is preferable that the second lens unit G2 which is the focusing lens unit is solely composed of a cemented lens element. In this case, chromatic aberration at a telephoto limit during focusing can be suitably compensated.

In the zoom lens systems according to Embodiments 3 to 4, the fourth lens unit G4 is moved in a direction perpendicular to the optical axis in order to optically compensate image blur caused by vibration of an optical system. Because a lens unit which is located on the image side relative to the aperture diaphragm A and has negative optical power is an image blur compensating lens unit, the lens diameter of the lens unit can be reduced. In addition, when at least one lens unit having positive optical power is arranged on the image side relative to the image blur compensating lens unit, excellent optical performance during image blur compensation can be maintained.

In the zoom lens systems according to Embodiments 3 to 4, the third lens unit G3 is, in order from the object side to the image side, composed of a first sub lens unit having negative optical power and a second sub lens unit having positive optical power. The aperture diaphragm A is arranged adjacent to the first sub lens unit. Because the aperture diaphragm A is arranged adjacent to the first sub lens unit having negative optical power, the height of an axial light beam passing through the aperture diaphragm A can be reduced. As a result, the outer diameter of a lens barrel can be reduced.

In the zoom lens systems according to Embodiments 3 to 4, because the fifth lens unit G5 located on the image side relative to the fourth lens unit G4 which is the image blur compensating lens unit is composed of at least three lens elements, excellent optical performance during image blur compensation can be maintained.

The following description is given for conditions preferred to be satisfied by a zoom lens system like the zoom lens systems according to Embodiments 1 to 4. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, a zoom lens system like the zoom lens systems according to Embodiments 1 to 4, which comprises, in order from the object side to the image side, a first lens unit having positive optical power, a second lens unit having positive optical power, and at least one subsequent lens unit, wherein the zoom lens system has an image blur compensating lens unit which moves in a direction perpendicular to an optical axis in order to optically compensate image blur, and at least the first lens unit moves along the optical axis at the time of zooming from a wide-angle limit to a telephoto limit, and the second lens unit or a third lens unit which is located closest to the object side in the at least one subsequent lens unit moves along the optical axis at the time of focusing from an infinity in-focus condition to a close-object in-focus condition (this lens configuration is referred to as a basic configuration of the embodiments, hereinafter), satisfies the following condition (1).

$$0.10 < |m|/(f_T - f_W) < 0.40 \tag{1}$$

where m is the maximum value among the amounts of movement of each subsequent lens unit at the time of zooming from a wide-angle limit to a telephoto limit, $f_T$ is a focal length of the entire system at a telephoto limit, and $f_W$ is a focal length of the entire system at a wide-angle limit.

The condition (1) sets forth the maximum amount of movement of the subsequent lens units located on the image side relative to the first lens unit having positive optical power and the second lens unit having positive optical power, from the wide-angle limit to the telephoto limit. When the condition (1) is satisfied, the amount of movement of each subsequent lens unit can be suppressed in a small amount with maintaining excellent optical performance. When the value exceeds the upper limit of the condition (1), the amount of movement of each subsequent lens unit is increased, and the overall length of zoom lens system tends to be increased. As a result, downsize of the zoom lens system becomes insufficient. On the other hand, when the value goes below the lower limit of the condition (1), the optical power of each subsequent lens unit is increased, which results in a difficulty in maintaining excellent optical performance with suppressing deterioration in performance, which is caused by manufacturing errors.

When at least one of the following conditions (1)' and (1)" is satisfied, the above-mentioned effect is achieved more successfully.

$$0.11 < |m|/(f_T - f_W) \tag{1}'$$

$$|m|/(f_T - f_W) < 0.30 \tag{1}''$$

For example, a zoom lens system having the basic configuration like the zoom lens systems according to Embodiments 1 to 4 preferably satisfies the following condition (2).

$$0.2 < f_1/f_2 < 2.0 \tag{2}$$

where $f_1$ is a focal length of the first lens unit, and $f_2$ is a focal length of the second lens unit.

The condition (2) sets forth the ratio of the focal length of the first lens unit to the focal length of the second lens unit. When the condition (2) is satisfied, the overall length of lens system can be reduced along with suitable compensation of spherical aberration and magnification chromatic aberration at a telephoto limit. When the value exceeds the upper limit of the condition (2), the optical power of the second lens unit is increased, which may result in a deterioration in spherical aberration and magnification chromatic aberration. On the other hand, when the value goes below the lower limit of the condition (2), the optical power of the second lens unit is decreased, which may result in an increase in the amount of movement of the second lens unit during focusing with itself. Also, the height of an incident light beam to the third lens unit is increased during focusing with itself. In both cases, it becomes difficult to downsize the lens system.

When at least one of the following conditions (2)' and (2)" is satisfied, the above-mentioned effect is achieved more successfully.

$$0.35 < f_1/f_2 \tag{2}'$$

$$f_1/f_2 < 1.80 \tag{2}''$$

For example, a zoom lens system having the basic configuration like the zoom lens systems according to Embodiments 3 to 4, in which the second lens unit performs focusing from an infinity in-focus condition to a close-object in-focus condition, preferably satisfies the following condition (3).

$$0.20 < D_{12W}/f_W < 0.45 \tag{3}$$

where $D_{12W}$ is an axial interval between the first lens unit and the second lens unit at a wide-angle limit, and $f_W$ is a focal length of the entire system at a wide-angle limit.

The condition (3) sets forth the overall lengths in an axial direction of the first lens unit and the second lens unit at a wide-angle limit. When the condition (3) is satisfied, the second lens unit can be downsized. As a result, in a case that focusing is performed with the second lens unit, increase in the weight of the second lens unit can be suppressed. When the value exceeds the upper limit of the condition (3), the overall length of zoom lens system tends to be increased, which results in a difficulty in downsizing the zoom lens system. On the other hand, when the value goes below the lower limit of the condition (3), the second lens unit tends to grow in size, which results in a difficulty in focusing with the second lens unit.

When at least one of the following conditions (3)' and (3)" is satisfied, the above-mentioned effect is achieved more successfully.

$$0.3 < D_{12W}/f_W \tag{3}'$$

$$D_{12W}/f_W < 0.4 \tag{3}''$$

For example, a zoom lens system having the basic configuration like the zoom lens systems according to Embodiments 3 to 4, in which the second lens unit performs focusing from an infinity in-focus condition to a close-object in-focus condition, and the third lens unit comprises at least two sub lens units, preferably satisfies the following condition (4).

$$0.05 < D_3/f_W < 0.25 \tag{4}$$

where $D_3$ is an axial interval between a sub lens unit (G31) and a sub lens unit (G32) which is different from the sub lens unit (G31) and is arranged on the image side relative to the sub lens unit (G31), and $f_W$ is a focal length of the entire system at a wide-angle limit.

The condition (4) sets forth the interval of each of the sub lens units constituting the third lens unit. When the condition (4) is satisfied, an increase in the overall length of lens system can be suppressed along with suppression of deterioration in performance, which is caused by manufacturing errors due to the sub lens units. When the value exceeds the upper limit of the condition (4), the optical power of each of the two sub lens units is decreased, which may result in an increase in the overall length of lens system. On the other hand, when the value goes below the lower limit of the condition (4), the optical power of each of the two sub lens units is increased, which may result in deterioration in spherical aberration at a wide-angle limit. Also, it becomes difficult to suppress deterioration in performance, which is caused by manufacturing errors.

When at least one of the following conditions (4)' and (4)" is satisfied, the above-mentioned effect is achieved more successfully.

$$0.08 < D_3/f_W \qquad (4)'$$

$$D_3/f_W < 0.23 \qquad (4)''$$

For example, a zoom lens system having the basic configuration like the zoom lens systems according to Embodiments 1 to 2, in which the third lens unit performs focusing from an infinity in-focus condition to a close-object in-focus condition, and a fourth lens unit is arranged just on the image side relative to the third lens unit, as the subsequent lens unit, preferably satisfies the following condition (5).

$$0.20 < D_{34T}/f_W < 0.35 \qquad (5)$$

where $D_{34T}$ is an axial interval between the third lens unit and the fourth lens unit at a telephoto limit, and $f_W$ is a focal length of the entire system at a wide-angle limit.

The condition (5) sets forth the interval between the third lens unit and the fourth lens unit at a telephoto limit. When the condition (5) is satisfied, increase in the overall length of lens system can be suppressed with maintaining excellent optical performance. When the value exceeds the upper limit of the condition (5), the composite optical power of the third lens unit and the fourth lens unit is decreased, which may result in increasing in the overall length of lens system. On the other hand, when the value goes below the lower limit of the condition (5), the composite optical power of the third lens unit and the fourth lens unit is increased, which results in a difficulty in suppressing deterioration in performance, which is caused by manufacturing errors, with maintaining excellent optical performance.

When at least one of the following conditions (5)' and (5)" is satisfied, the above-mentioned effect is achieved more successfully.

$$0.25 < D_{34T}/f_W \qquad (5)'$$

$$D_{34T}/f_W < 0.30 \qquad (5)''$$

The individual lens units constituting the zoom lens system according to each of the embodiments may be each composed exclusively of refractive type lens elements that deflect incident light by refraction (that is, lens elements of a type in which deflection is achieved at the interface between media having different refractive indices). Alternatively the lens units may employ any one of: or a combination of at least two of: diffractive type lens elements that deflect incident light by diffraction; refractive-diffractive hybrid type lens elements that deflect incident light by a combination of diffraction and refraction; and gradient index type lens elements that deflect incident light by distribution of refractive index in the medium.

Embodiment 5

Figure 13:
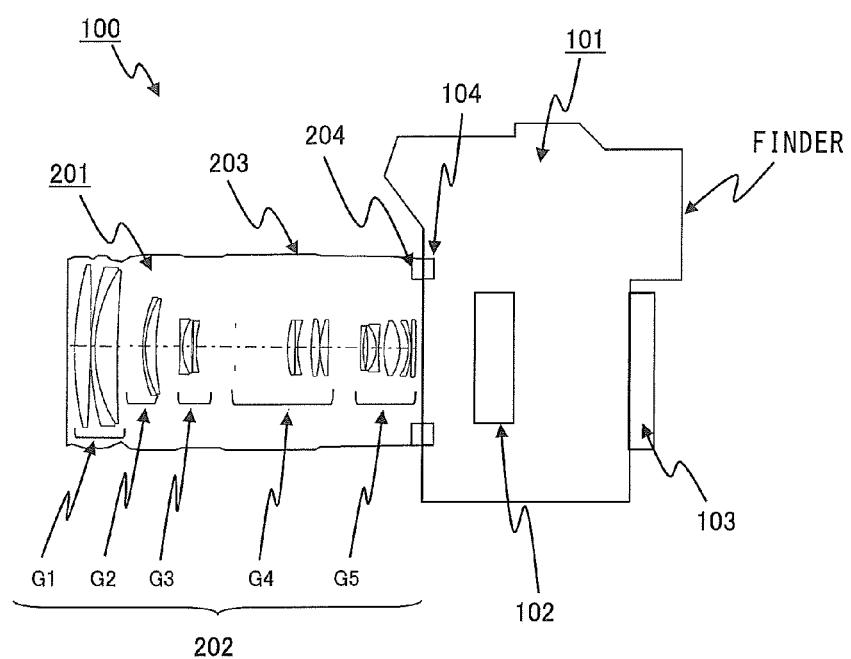
FIG. 13 is a schematic construction diagram of an interchangeable-lens type digital camera system according to Embodiment 5.

FIG. 13 is a schematic construction diagram of an interchangeable-lens type digital camera system according to Embodiment 5.

The interchangeable-lens type digital camera system (referred to simply as "camera system", hereinafter) 100 according to Embodiment 5 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of the above-mentioned Embodiments 1 to 4; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 13, the zoom lens system according to Embodiment 1 is employed as the zoom lens system 202.

In Embodiment 5, the zoom lens system 202 according to any of Embodiments 1 to 4 is employed. Accordingly, a compact interchangeable lens apparatus having excellent imaging performance can be realized at low cost. Moreover, size reduction and cost reduction of the entire camera system 100 according to Embodiment 5 can be achieved.

Numerical examples are described below in which the zoom lens systems according to the embodiments are implemented. As described below, Numerical Examples 1, 2, 3, and 4 correspond to Embodiments 1, 2, 3, and 4, respectively. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

FIGS. 2, 5, 8, and 11 are longitudinal aberration diagrams of an infinity in-focus condition of the zoom lens systems according to Numerical Examples 1, 2, 3, and 4, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, and 12 are lateral aberration diagrams of the zoom lens systems according to Numerical Examples 1, 2, 3, and 4, respectively, at a telephoto limit in a basic state where image blur compensation is not performed and in an image blur compensation state.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the fourth lens unit G4 (Numerical Examples 3 to 4) or the image blur compensating sub lens unit (Numerical Examples 1 to 2, the first sub lens unit: the thirteenth lens element L13, the fourteenth lens element L14 and the fifteenth lens element L15) included in the fifth lens unit G5 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1.

In the zoom lens system according to each of the numerical examples, the amount of movement ($Y_T$: mm) of the image blur compensating lens unit (the fourth lens unit G4 or the image blur compensating sub lens unit included in the fifth lens unit G5) in a direction perpendicular to the optical axis in the image blur compensation state at a telephoto limit is as shown in Table 1. The image blur compensation angle is 0.3°. That is, the following amount of movement of the image blur compensating lens unit is equal to the amount of image decentering in a case that the optical axis of the zoom lens system inclines by 0.3°.

TABLE 1

(Amount of movement of image blur compensating lens unit)

| Numerical Example | Amount of movement ($Y_T$: mm) |
|---|---|
| 1 | 0.487 |
| 2 | 0.499 |
| 3 | 0.454 |
| 4 | 0.417 |

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 2 shows the surface data of the zoom lens system of Numerical Example 1. Table 3 shows the various data. Table 4 shows the single lens data. Table 5 shows the zoom lens unit data. Table 6 shows the magnification of zoom lens unit.

TABLE 2

(Surface data)

| Surface number | r | d | nd | vd |
|---|---|---|---|---|
| Object surface | ∞ | | | |
| 1 | 105.89260 | 5.00000 | 1.48749 | 70.4 |
| 2 | −871.75260 | 0.20000 | | |
| 3 | 86.18050 | 1.33530 | 1.64769 | 33.8 |
| 4 | 47.06930 | 7.00000 | 1.49700 | 81.6 |
| 5 | 398.98120 | Variable | | |
| 6 | 43.86320 | 0.84520 | 1.67003 | 47.2 |
| 7 | 33.22840 | 3.27060 | 1.51680 | 64.2 |
| 8 | 70.73210 | Variable | | |
| 9 | −250.05990 | 0.80180 | 1.75520 | 27.5 |
| 10 | 16.74320 | 2.88910 | 1.94595 | 18.0 |
| 11 | 97.25830 | 0.56640 | | |
| 12 | −646.14680 | 0.93390 | 1.84666 | 23.9 |
| 13 | 36.72480 | Variable | | |
| 14 (Diaphragm) | ∞ | 16.80340 | | |
| 15 | 33.28620 | 2.28540 | 1.49700 | 81.6 |
| 16 | −557.69320 | 0.20000 | | |
| 17 | ∞ | 0.80000 | 1.72825 | 28.3 |
| 18 | 26.92120 | 4.26840 | | |
| 19 | 50.35330 | 2.67760 | 1.51680 | 64.2 |
| 20 | −47.97910 | 0.20000 | | |
| 21 | 25.91350 | 2.57160 | 1.60625 | 63.7 |
| 22 | 1577.45080 | Variable | | |
| 23 | 152.45800 | 0.80000 | 1.91082 | 35.2 |
| 24 | 22.04310 | 1.45300 | | |
| 25 | −39.80080 | 2.73090 | 1.75211 | 25.0 |
| 26 | −11.67920 | 0.80000 | 1.73351 | 51.2 |
| 27 | 79.18850 | 1.71970 | | |
| 28 | 29.23330 | 4.89890 | 1.48749 | 70.4 |
| 29 | −17.50910 | 2.80320 | | |
| 30 | −14.92960 | 0.80000 | 1.73351 | 51.2 |
| 31 | −27.07170 | 0.20000 | | |
| 32 | −420.46250 | 1.33660 | 1.84666 | 23.8 |
| 33 | −169.62320 | (BF) | | |
| Image surface | ∞ | | | |

TABLE 3

(Various data)
Zooming ratio 2.82430

| | Wide-angle limit | Middle position | Telephoto limit |
|---|---|---|---|
| Focal length | 103.0002 | 173.1132 | 290.9033 |
| F-number | 4.10008 | 5.20084 | 5.77077 |
| View angle | 6.0244 | 3.5079 | 2.0889 |
| Image height | 10.8150 | 10.8150 | 10.8150 |
| Overall length of lens system | 143.9705 | 172.0082 | 193.2900 |
| BF | 19.99859 | 21.19552 | 42.76568 |
| d5 | 1.6399 | 52.1654 | 63.7170 |
| d8 | 22.0268 | 5.8466 | 4.0101 |
| d13 | 13.4234 | 12.3236 | 11.2572 |
| d22 | 16.6908 | 10.2861 | 1.3490 |
| Entrance pupil position | 105.3193 | 281.7077 | 405.2532 |
| Exit pupil position | −45.9299 | −45.8110 | −45.6343 |
| Front principal points position | 47.4019 | 7.5779 | −261.1375 |
| Back principal points position | 40.9702 | −1.1050 | −97.6133 |

TABLE 4

(Single lens data)

| Lens element | Initial surface number | Focal length |
|---|---|---|
| 1 | 1 | 194.0175 |
| 2 | 3 | −162.3104 |
| 3 | 4 | 106.6703 |
| 4 | 6 | −211.2811 |
| 5 | 7 | 117.7646 |
| 6 | 9 | −20.7524 |
| 7 | 10 | 21.0142 |
| 8 | 12 | −41.0177 |
| 9 | 15 | 63.2836 |
| 10 | 17 | −36.9670 |
| 11 | 19 | 47.9855 |
| 12 | 21 | 43.4306 |
| 13 | 23 | −28.3749 |
| 14 | 25 | 21.0983 |
| 15 | 26 | −13.8244 |
| 16 | 28 | 23.2619 |
| 17 | 30 | −46.6816 |
| 18 | 32 | 335.0012 |

TABLE 5

(Zoom lens unit data)

| Lens unit | Initial surface No. | Focal length | Overall length of lens unit | Front principal points position | Back principal points position |
|---|---|---|---|---|---|
| 1 | 1 | 120.88971 | 13.53530 | 0.43112 | 4.98053 |
| 2 | 6 | 276.37473 | 4.11580 | −6.03129 | −4.39709 |
| 3 | 9 | −39.41433 | 5.19120 | 3.41181 | 5.54983 |
| 4 | 14 | 29.28596 | 29.80640 | 25.59273 | 28.44233 |
| 5 | 23 | −33.94750 | 17.54230 | −2.59625 | 0.99307 |

TABLE 6

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.70306 | 0.80676 | 0.83491 |
| 3 | 9 | −4.53033 | 10.43326 | 4.05412 |
| 4 | 14 | −0.12882 | 0.08056 | 0.25878 |
| 5 | 23 | 2.07660 | 2.11186 | 2.74725 |

Numerical Example 2

The zoom lens system of Numerical Example 2 corresponds to Embodiment 2 shown in FIG. 4. Table 7 shows the surface data of the zoom lens system of Numerical Example 2. Table 8 shows the various data. Table 9 shows the single lens data. Table 10 shows the zoom lens unit data. Table 11 shows the magnification of zoom lens unit.

TABLE 7

(Surface data)

| Surface number | r | d | nd | vd |
|---|---|---|---|---|
| Object surface | ∞ | | | |
| 1 | 120.12860 | 5.00000 | 1.48749 | 70.4 |
| 2 | −426.76030 | 0.20000 | | |
| 3 | 80.14410 | 1.33530 | 1.64769 | 33.8 |
| 4 | 45.73480 | 7.00000 | 1.49700 | 81.6 |
| 5 | 278.22260 | Variable | | |
| 6 | 51.86200 | 0.86380 | 1.69351 | 53.4 |
| 7 | 36.72470 | 3.38740 | 1.51680 | 64.2 |
| 8 | 99.94570 | Variable | | |
| 9 | −196.84400 | 0.80000 | 1.75520 | 27.5 |
| 10 | 18.50600 | 2.64120 | 1.94595 | 18.0 |
| 11 | 74.93750 | 0.50430 | | |
| 12 | −410.34100 | 0.80000 | 1.90366 | 31.3 |
| 13 | 46.00270 | Variable | | |
| 14 (Diaphragm) | ∞ | 18.21320 | | |
| 15 | 40.55760 | 2.64040 | 1.49700 | 81.6 |
| 16 | −143.74510 | 1.05970 | | |
| 17 | 212.19430 | 0.80000 | 1.74000 | 28.2 |
| 18 | 29.27620 | 1.85170 | | |
| 19 | 57.99860 | 2.71670 | 1.51680 | 64.2 |
| 20 | −57.28700 | 0.20000 | | |
| 21 | 24.07470 | 2.94490 | 1.52542 | 64.6 |
| 22 | 403.44750 | Variable | | |
| 23 | 177.91980 | 0.81090 | 1.91082 | 35.2 |
| 24 | 22.24050 | 1.73500 | | |
| 25 | −53.51410 | 2.57770 | 1.80518 | 25.5 |
| 26 | −13.29560 | 0.80000 | 1.74330 | 49.2 |
| 27 | 95.48470 | 1.47990 | | |
| 28 | 33.03540 | 3.93600 | 1.48749 | 70.4 |
| 29 | −22.28060 | 5.28950 | | |
| 30 | −18.66740 | 0.80000 | 1.91082 | 35.2 |
| 31 | −47.76420 | 0.20000 | | |
| 32 | 123.85850 | 1.84910 | 1.84666 | 23.8 |
| 33 | −110.38600 | (BF) | | |
| Image surface | ∞ | | | |

TABLE 8

(Various data)
Zooming ratio 2.82504

| | Wide-angle limit | Middle position | Telephoto limit |
|---|---|---|---|
| Focal length | 103.0032 | 173.1303 | 290.9878 |
| F-number | 4.10040 | 5.20054 | 5.77035 |
| View angle | 5.9794 | 3.5002 | 2.0995 |
| Image height | 10.8150 | 10.8150 | 10.8150 |
| Overall length of lens system | 150.0142 | 173.0771 | 198.8992 |
| BF | 20.95298 | 20.93933 | 45.28700 |
| d5 | 4.2172 | 49.3425 | 64.6431 |
| d8 | 19.5937 | 8.3597 | 3.5293 |
| d13 | 14.1268 | 10.8964 | 11.5107 |
| d22 | 18.6868 | 11.1025 | 1.4924 |
| Entrance pupil position | 99.8242 | 264.9382 | 401.9856 |
| Exit pupil position | −44.9547 | −44.5516 | −43.9802 |
| Front principal points position | 41.8498 | −19.6150 | −255.5712 |
| Back principal points position | 47.0109 | −0.0532 | −92.0886 |

TABLE 9

(Single lens data)

| Lens element | Initial surface number | Focal length |
|---|---|---|
| 1 | 1 | 192.8720 |
| 2 | 3 | −167.0134 |
| 3 | 4 | 109.0348 |
| 4 | 6 | −185.7695 |
| 5 | 7 | 110.3273 |

TABLE 9-continued (Single lens data)

| Lens element | Initial surface number | Focal length |
|---|---|---|
| 6 | 9 | −22.3632 |
| 7 | 10 | 25.4012 |
| 8 | 12 | −45.7373 |
| 9 | 15 | 63.9515 |
| 10 | 17 | −45.9800 |
| 11 | 19 | 56.2184 |
| 12 | 21 | 48.5976 |
| 13 | 23 | −27.9760 |
| 14 | 25 | 21.3607 |
| 15 | 26 | −15.6519 |
| 16 | 28 | 27.9472 |
| 17 | 30 | −34.0909 |
| 18 | 32 | 69.1885 |

TABLE 10

(Zoom lens unit data)

| Lens unit | Initial surface No. | Focal length | Overall length of lens unit | Front principal points position | Back principal points position |
|---|---|---|---|---|---|
| 1 | 1 | 120.79921 | 13.53530 | 0.28255 | 4.86253 |
| 2 | 6 | 281.14067 | 4.25120 | −4.68601 | −3.06172 |
| 3 | 9 | −35.87887 | 4.74550 | 2.77129 | 4.76514 |
| 4 | 14 | 31.48359 | 30.42660 | 24.22195 | 26.97351 |
| 5 | 23 | −36.49219 | 19.47810 | −1.52636 | 2.80153 |

TABLE 11

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.71403 | 0.80646 | 0.84348 |
| 3 | 9 | −2.41771 | −402.79832 | 6.53708 |
| 4 | 14 | −0.24317 | −0.00217 | 0.16192 |
| 5 | 23 | 2.03117 | 2.03079 | 2.69800 |

Numerical Example 3

The zoom lens system of Numerical Example 3 corresponds to Embodiment 3 shown in FIG. 7. Table 12 shows the surface data of the zoom lens system of Numerical Example 3. Table 13 shows the various data. Table 14 shows the single lens data. Table 15 shows the zoom lens unit data. Table 16 shows the magnification of zoom lens unit.

TABLE 12

(Surface data)

| Surface number | r | d | nd | vd |
|---|---|---|---|---|
| Object surface | ∞ | | | |
| 1 | 120.51440 | 4.10180 | 1.48749 | 70.4 |
| 2 | ∞ | 0.20010 | | |
| 3 | 85.63570 | 1.90070 | 1.68893 | 31.2 |
| 4 | 54.12160 | 6.40130 | 1.49700 | 81.6 |
| 5 | 300.49570 | Variable | | |
| 6 | 35.26850 | 0.90010 | 1.62004 | 36.3 |
| 7 | 21.47210 | 4.20330 | 1.48749 | 70.4 |
| 8 | ∞ | Variable | | |
| 9 | −78.36840 | 0.80070 | 1.77250 | 49.6 |
| 10 | 29.03300 | 1.31110 | | |
| 11 | 34.49490 | 2.30120 | 1.94595 | 18.0 |
| 12 | −162.95940 | 0.80060 | 1.90366 | 31.3 |
| 13 | 30.04010 | 4.26350 | | |
| 14(Diaphragm) | ∞ | 17.19270 | | |
| 15 | 51.39220 | 2.50010 | 1.58913 | 61.3 |
| 16 | −73.34390 | 0.15010 | | |
| 17 | 26.75080 | 0.80000 | 1.84666 | 23.8 |
| 18 | 14.98860 | 5.02380 | 1.58913 | 61.3 |
| 19 | −87.43470 | Variable | | |
| 20 | 23.23170 | 0.80040 | 1.77250 | 49.6 |
| 21 | 13.10340 | 2.08040 | | |
| 22 | −50.37300 | 2.05100 | 1.84666 | 23.8 |
| 23 | −17.74240 | 0.80040 | 1.77250 | 49.6 |
| 24 | 32.73270 | Variable | | |
| 25 | 22.41450 | 5.10110 | 1.51680 | 64.2 |
| 26 | −22.45190 | 3.69230 | | |
| 27 | −18.20830 | 0.80070 | 1.91082 | 35.2 |
| 28 | −312.61980 | 0.15000 | | |
| 29 | 43.52060 | 2.30080 | 1.84666 | 23.8 |
| 30 | −637.06910 | (BF) | | |
| Image surface | ∞ | | | |

TABLE 13

(Various data)
Zooming ratio 2.82617

| | Wide-angle limit | Middle position | Telephoto limit |
|---|---|---|---|
| Focal length | 102.7209 | 174.1910 | 290.3070 |
| F-number | 4.11397 | 4.86257 | 5.77082 |
| View angle | 5.9655 | 3.5449 | 2.1271 |
| Image height | 10.8150 | 10.8150 | 10.8150 |
| Overall length of lens system | 142.4843 | 171.6440 | 200.8351 |
| BF | 15.42012 | 27.89229 | 42.07583 |
| d5 | 33.6396 | 57.5749 | 83.6685 |
| d8 | 7.4452 | 7.4930 | 2.3486 |
| d19 | 12.4788 | 6.1560 | 1.0408 |
| d24 | 2.8724 | 1.8996 | 1.0732 |
| Entrance pupil position | 115.4380 | 228.5110 | 418.3390 |
| Exit pupil position | −33.5913 | −31.0628 | −29.0520 |
| Front principal points position | 2.8704 | −111.9699 | −476.2374 |
| Back principal points position | 39.7634 | −2.5471 | −89.4719 |

TABLE 14

(Single lens data)

| Lens element | Initial surface number | Focal length |
|---|---|---|
| 1 | 1 | 247.2143 |
| 2 | 3 | −218.8586 |
| 3 | 4 | 131.6830 |
| 4 | 6 | −90.7942 |
| 5 | 7 | 44.0463 |
| 6 | 9 | −27.3348 |
| 7 | 11 | 30.2670 |
| 8 | 12 | −28.0134 |
| 9 | 15 | 51.6771 |
| 10 | 17 | −41.5582 |
| 11 | 18 | 22.1210 |
| 12 | 20 | −40.2950 |
| 13 | 22 | 31.4438 |

TABLE 14-continued (Single lens data)

| Lens element | Initial surface number | Focal length |
|---|---|---|
| 14 | 23 | −14.7920 |
| 15 | 25 | 22.5787 |
| 16 | 27 | −21.2550 |
| 17 | 29 | 48.1902 |

TABLE 15

(Zoom lens unit data)

| Lens unit | Initial surface No. | Focal length | Overall length of lens unit | Front principal points position | Back principal points position |
|---|---|---|---|---|---|
| 1 | 1 | 143.13818 | 12.60390 | −0.61627 | 3.73372 |
| 2 | 6 | 87.20136 | 5.10340 | −0.29909 | 1.42586 |
| 3 | 9 | 25.73933 | 35.14380 | 26.82042 | 56.50803 |
| 4 | 20 | −15.70240 | 5.73220 | 2.42875 | 4.15321 |
| 5 | 25 | 41.35217 | 12.04490 | −3.41568 | 0.71736 |

TABLE 16

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.46352 | 0.53109 | 0.63144 |
| 3 | 9 | 0.74438 | 0.89878 | 1.02826 |
| 4 | 20 | 5.88911 | 49.44138 | −10.71862 |
| 5 | 25 | 0.35317 | 0.05157 | −0.29143 |

Numerical Example 4

The zoom lens system of Numerical Example 4 corresponds to Embodiment 4 shown in FIG. 10. Table 17 shows the surface data of the zoom lens system of Numerical Example 4. Table 18 shows the various data. Table 19 shows the single lens data. Table 20 shows the zoom lens unit data. Table 21 shows the magnification of zoom lens unit.

TABLE 17

(Surface data)

| Surface number | r | d | nd | vd |
|---|---|---|---|---|
| Object surface | ∞ | | | |
| 1 | 99.57310 | 5.00000 | 1.48749 | 70.4 |
| 2 | −3147.66250 | 0.20000 | | |
| 3 | 72.16670 | 1.30240 | 1.64769 | 33.8 |
| 4 | 43.25590 | 7.00000 | 1.49700 | 81.6 |
| 5 | 159.98290 | Variable | | |
| 6 | 35.57140 | 0.80000 | 1.60323 | 42.5 |
| 7 | 18.93980 | 3.91130 | 1.51680 | 64.2 |
| 8 | 229.23560 | Variable | | |
| 9 | −69.76930 | 0.80000 | 1.69680 | 55.5 |
| 10 | 18.09430 | 0.77690 | | |
| 11 | 39.98810 | 1.58620 | 1.78590 | 43.9 |
| 12 | 21.43280 | 0.94750 | | |
| 13 | 24.19070 | 3.00980 | 1.94595 | 18.0 |
| 14 | 48.98130 | 1.70330 | | |
| 15(Diaphragm) | ∞ | 9.58480 | | |
| 16 | 32.52270 | 5.36790 | 1.49700 | 81.6 |
| 17 | −33.22870 | 0.20000 | | |
| 18 | 37.79920 | 0.80000 | 1.69895 | 30.0 |
| 19 | 16.06200 | 1.11780 | | |
| 20 | 17.74900 | 4.68960 | 1.49700 | 81.6 |
| 21 | −48.61900 | Variable | | |
| 22 | 47.30340 | 0.80000 | 1.78590 | 43.9 |
| 23 | 16.98380 | 1.20240 | | |
| 24 | −99.80740 | 2.55330 | 1.75520 | 27.5 |
| 25 | −12.38640 | 0.80000 | 1.72916 | 54.7 |
| 26 | 33.76420 | Variable | | |
| 27 | 20.59410 | 4.73920 | 1.49700 | 81.6 |
| 28 | −23.01700 | 3.93520 | | |
| 29 | −17.07860 | 0.80000 | 1.91082 | 35.2 |
| 30 | −69.57970 | 0.44740 | | |
| 31 | 50.23860 | 3.34040 | 1.67270 | 32.2 |
| 32 | −672.92370 | (BF) | | |
| Image surface | ∞ | | | |

TABLE 18

(Various data)
Zooming ratio 2.82492

| | Wide-angle limit | Middle position | Telephoto limit |
|---|---|---|---|
| Focal length | 102.9987 | 173.1272 | 290.9632 |
| F-number | 4.10049 | 5.20062 | 5.77047 |
| View angle | 5.9664 | 3.5578 | 2.1267 |
| Image height | 10.8150 | 10.8150 | 10.8150 |
| Overall length of lens system | 143.8041 | 167.6709 | 197.2574 |
| BF | 15.58902 | 28.12740 | 49.48389 |
| d5 | 37.4204 | 57.8916 | 76.4256 |
| d8 | 3.3295 | 5.5053 | 2.0158 |
| d21 | 16.3267 | 7.7441 | 0.9466 |
| d26 | 3.7231 | 0.9871 | 0.9701 |
| Entrance pupil position | 112.2787 | 234.2787 | 388.4450 |
| Exit pupil position | −36.2151 | −28.9197 | −27.8160 |
| Front principal points position | 10.4918 | −118.0030 | −415.8017 |
| Back principal points position | 40.8054 | −5.4563 | −93.7058 |

TABLE 19

(Single lens data)

| Lens element | Initial surface number | Focal length |
|---|---|---|
| 1 | 1 | 198.0935 |
| 2 | 3 | −169.7127 |
| 3 | 4 | 116.9585 |
| 4 | 6 | −68.3897 |
| 5 | 7 | 39.6974 |
| 6 | 9 | −20.5431 |
| 7 | 11 | −61.0701 |
| 8 | 13 | 47.7114 |
| 9 | 16 | 33.9918 |
| 10 | 18 | −40.5750 |
| 11 | 20 | 26.7902 |
| 12 | 22 | −34.1122 |
| 13 | 24 | 18.4930 |
| 14 | 25 | −12.3378 |
| 15 | 27 | 22.6881 |
| 16 | 29 | −25.0322 |
| 17 | 31 | 69.6232 |

TABLE 20

(Zoom lens unit data)

| Lens unit | Initial surface No. | Focal length | Overall length of lens unit | Front principal points position | Back principal points position |
|---|---|---|---|---|---|
| 1 | 1 | 131.31005 | 13.50240 | −1.35259 | 3.33392 |
| 2 | 6 | 97.36815 | 4.71130 | −0.89859 | 0.76560 |
| 3 | 9 | 32.58968 | 30.58380 | 26.33294 | 54.52650 |
| 4 | 22 | −17.08612 | 5.35570 | 1.80470 | 3.68344 |
| 5 | 27 | 40.81610 | 13.26220 | −3.40571 | 0.80121 |

TABLE 21

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.53503 | 0.60284 | 0.68098 |
| 3 | 9 | 0.73640 | 0.91862 | 1.03929 |
| 4 | 22 | 6.36529 | 426.75313 | −6.04824 |
| 5 | 27 | 0.31277 | 0.00558 | −0.51766 |

The following Table 22 shows the corresponding values to the individual conditions in the zoom lens systems of each of Numerical Examples.

TABLE 22

(Values corresponding to conditions)

| | | Numerical Example | | | |
|---|---|---|---|---|---|
| Condition | | 1 | 2 | 3 | 4 |
| (1) | $|m|/(f_T - f_W)$ | 0.12 | 0.13 | 0.14 | 0.18 |
| (2) | $f_1/f_2$ | 0.44 | 0.43 | 1.64 | 1.35 |
| (3) | $D_{12W}/f_W$ | — | — | 0.33 | 0.36 |
| (4) | $D_3/f_W$ | — | — | 0.21 | 0.11 |
| (5) | $D_{34T}/f_W$ | 0.27 | 0.29 | — | — |

The zoom lens system according to the present invention is applicable to a digital still camera, a digital video camera, a camera for a mobile telephone, a camera for a PDA (Personal Digital Assistance), a surveillance camera in a surveillance system, a Web camera, a vehicle-mounted camera or the like. In particular, the zoom lens system according to the present invention is suitable for a photographing optical system where high image quality is required like in a digital still camera system or a digital video camera system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising:
a first lens unit having positive optical power;
a second lens unit having positive optical power; and
at least one subsequent lens unit, wherein
the zoom lens system has an image blur compensating lens unit which moves in a direction perpendicular to an optical axis in order to optically compensate image blur, at least the first lens unit moves along the optical axis at the time of zooming from a wide-angle limit to a telephoto limit,
the second lens unit or a third lens unit which is located closest to the object side in the at least one subsequent lens unit moves along the optical axis at the time of focusing from an infinity in-focus condition to a close-object in-focus condition, and
the following condition (1) is satisfied:

$$0.10 < |m|/(f_T - f_W) < 0.40 \quad (1)$$

where
m is the maximum value among the amounts of movement of each subsequent lens unit at the time of zooming from a wide-angle limit to a telephoto limit,
$f_T$ is a focal length of the entire system at a telephoto limit, and
$f_W$ is a focal length of the entire system at a wide-angle limit.

2. The zoom lens system as claimed in claim 1, wherein
the image blur compensating lens unit is the entirety of a lens unit having negative optical power, which is included in the at least one subsequent lens unit, or a sub lens unit which constitutes a part of the lens unit having negative optical power, and
at least one lens unit having positive optical power or at least one lens element having positive optical power is arranged on the image side relative to the image blur compensating lens unit.

3. The zoom lens system as claimed in claim 1, wherein the following condition (2) is satisfied:

$$0.2 < f_1/f_2 < 2.0 \quad (2)$$

where
$f_1$ is a focal length of the first lens unit, and
$f_2$ is a focal length of the second lens unit.

4. The zoom lens system as claimed in claim 1, wherein
the second lens unit performs focusing from an infinity in-focus condition to a close-object in-focus condition, and
the following condition (3) is satisfied:

$$0.20 < D_{12W}/f_W < 0.45 \quad (3)$$

where
$D_{12W}$ is an axial interval between the first lens unit and the second lens unit at a wide-angle limit, and
$f_W$ is a focal length of the entire system at a wide-angle limit.

5. The zoom lens system as claimed in claim 1, wherein
the second lens unit performs focusing from an infinity in-focus condition to a close-object in-focus condition,
the third lens unit comprises at least two sub lens units, and
the following condition (4) is satisfied:

$$0.05 < D_3/f_W < 0.25 \quad (4)$$

where
$D_3$ is an axial interval between a sub lens unit (G31) and a sub lens unit (G32) which is different from the sub lens unit (G31) and is arranged on the image side relative to the sub lens unit (G31), and
$f_W$ is a focal length of the entire system at a wide-angle limit.

6. The zoom lens system as claimed in claim 1, wherein
the third lens unit performs focusing from an infinity in-focus condition to a close-object in-focus condition,
a fourth lens unit is arranged just on the image side relative to the third lens unit, as the subsequent lens unit, and the following condition (5) is satisfied:

$$0.20 < D_{34T}/f_W < 0.35 \qquad (5)$$

where $D_{34T}$ is an axial interval between the third lens unit and the fourth lens unit at a telephoto limit, and $f_W$ is a focal length of the entire system at a wide-angle limit.

7. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

8. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *